Nov. 15, 1949     S. A. COONS     2,487,853
HOISTING HITCH
Filed Sept. 11, 1946
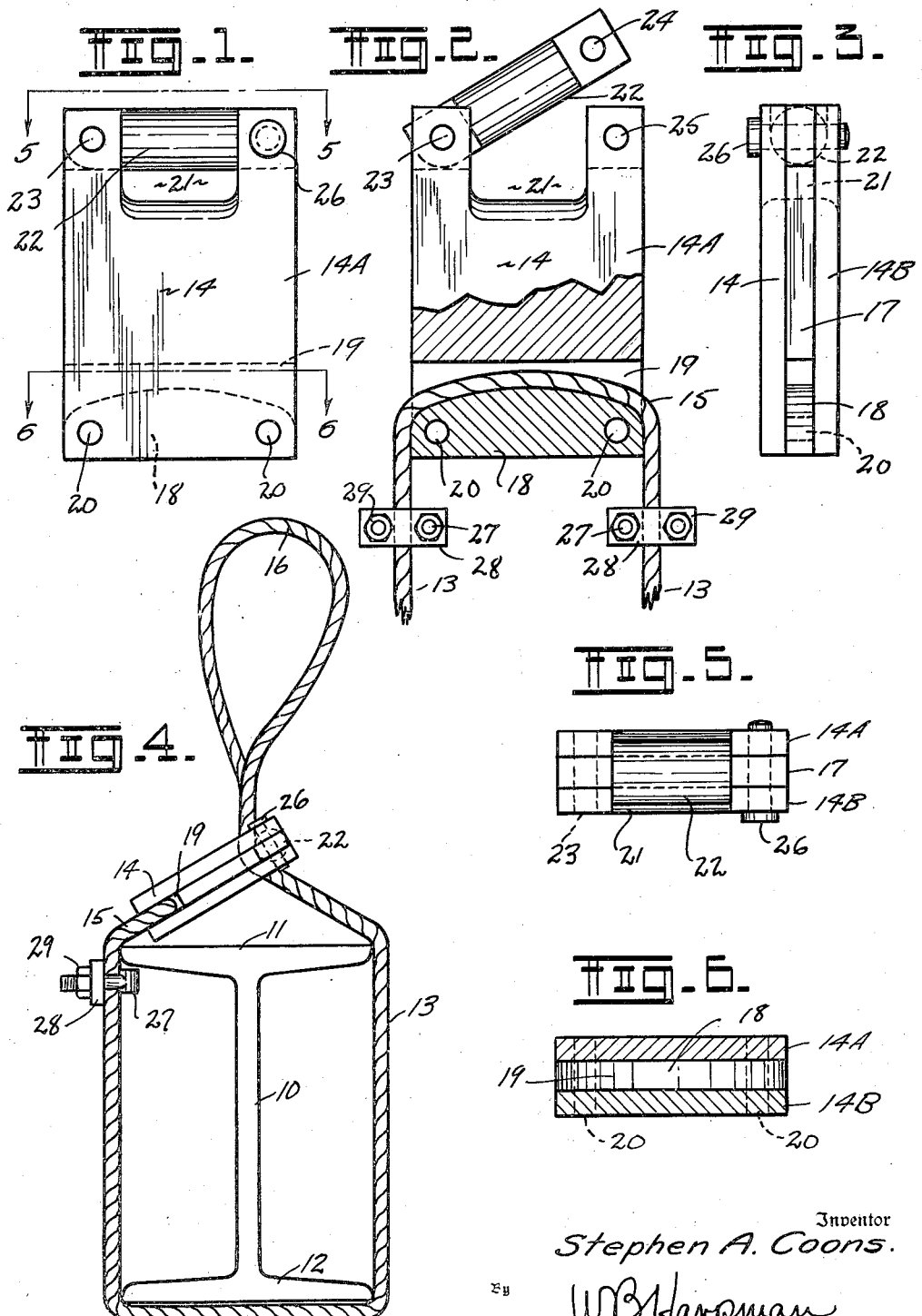
Inventor
Stephen A. Coons.
By W. B. Harpman
Attorney Patented Nov. 15, 1949

2,487,853

UNITED STATES PATENT OFFICE 2,487,853

HOISTING HITCH

Stephen A. Coons, near Millville, N. J.

Application September 11, 1946, Serial No. 696,072

3 Claims. (Cl. 294—74)

1

This invention relates to apparatus for handling structural steel and the like, and more particularly to slings and the like for supporting structural steel being lifted or handled by derricks and the like.

The principal object of the invention is the provision of a hoisting hitch for self-mounting a conventional hoisting sling as commonly used in handling various structural steel members.

A further object of the invention is the provision of a hoisting hitch comprising a section of suitable cable which may be passed about a structural steel member to be handled and including detachable means for effecting a secure hitch with respect to the structural steel section.

A still further object of the invention is the provision of a hoisting hitch for handling structural steel and including means for centering the hoisting hitch with respect to a structural steel member being handled thereby.

A still further object of the invention is the provision of a hoisting hitch for structural steel work and including a metallic connecting member, and a section of flexible cable, the connecting member including a detachably secured section for engaging and retaining a section of the flexible cable so as to form a sling.

The hoisting hitch shown and described herein has been designed to form a more practical and efficient device for safely securing a structural steel section to be handled by a crane or derrick as in building construction work. It has heretofore been customary to place a hoisting sling formed of a continuous section of flexible cable about the section of structural steel to be handled and thereby necessary to engage one portion of the sling through a looped end portion in order to secure the sling about the structural steel section. In handling large and heavy structural steel sections, the hoisting slings used are of necessity of heavy construction and difficult to handle. Considerable time was thereby wasted in manually placing the slings about the steel sections and positioning the end to be attached to the lifting crane through the looped sling. Further time was wasted in detaching the hoisting sling from the structural steel section as it was necessary to reverse the procedure.

The present invention relates to a connecting member used in combination with a hoisting sling to form a hoisting hitch. A portion of the connecting member is removably positioned so that it is not necessary to thread a portion of the hoisting sling through the device but merely place

2 it in appropriate position and close the removable portion of the connecting member thereover.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side view of the hoisting hitch connecting member.

Figure 2 is a side view of the hoisting hitch connecting member with parts in cross section and showing one end of a hoisting sling in position therein.

Figure 3 is an end elevation of the hoisting hitch connecting member.

Figure 4 is an end elevation of a section of structural steel showing the hoisting hitch in operative position thereabout.

Figure 5 is a top plan view of the hoisting hitch connecting member taken on line 5—5 of Figure 1.

Figure 6 is a horizontal cross section taken on line 6—6 of Figure 1.

By referring to the drawings and Figure 4 in particular, it will be seen that a section of structural steel comprising an I beam is indicated by the numeral 10 and that the upper flange portion is indicated by the numeral 11 and the lower flange portion by the numeral 12. A hoisting hitch is shown in operative position about the I beam 10, the hoisting hitch comprising an endless section of flexible cable 13, one portion permanently looped through a connecting member, generally indicated by the numeral 14, and the other portion of which is free and capable of being passed through another opening in the connecting member 14. As illustrated in Figure 4 of the drawings, the permanently attached portion of the cable 13 is indicated by the numeral 14 and the other or free portion of the cable is indicated by the numeral 16. The free portion 16 is looped as the cable 13 is continuous and thereby forms a convenient loop through which a hook of a derrick or a crane (not shown) may be positioned so that the I beam 11 may be picked up through the hoisting hitch.

By referring now to Figures 1, 2 and 3 of the drawings, it will be seen that the connecting member 14 comprises a pair of spaced body members 14A and 14B, spaced and secured to one another by a spacing member 17, which spacing member 17 is relatively shorter than the body members 14A and 14B and terminates short of the upper and lowermost portions thereof. The lowermost portion of the body member 14A and 14B are spaced by a secondary spacing member 18, the uppermost portion of which is curved transversely, as best shown in Figures 2 and 6 of the drawings, and which uppermost section terminates short of the lowermost portion of the spacing member 17 so as to form a transverse opening 19 through the connecting member 14. The end 15 of the flexible cable 13 is positioned through the transverse opening 19. The secondary spacing member 18 is positioned between the members 14A and 14B by means of rivets 20.

The uppermost portion of each of the body members 14A and 14B are cut away in their central areas to form an opening 21 which lies above the uppermost edge of the spacing member 17. In order that the free portion 16 of the endless cable 13, when it is positioned in the opening 21, may be retained therein, a latch member 22 is positioned at right angles to the opening 21 and transversely of the body members 14A and 14B and pivoted at one end to the body members 14A and 14B by a rivet 23. This construction enables the latch member 22 to be opened or closed with respect to the opening 21 as best shown in Figures 1 and 2. The other end of the latch member 22 is provided with an opening 24 which is adapted to register with a pair of openings 25 in the body members 14A and 14B so that when the three openings 24 and 25—25 are in registry, a pin 26 may be positioned therethrough so as to hold the latch member 22 in secure position in the uppermost end of the connecting member 14 thereby retaining the free end 16 of the cable 13 in the opening 21 as shown in operative position in Figure 4 of the drawings.

By referring to Figures 3 and 5 of the drawings it will be seen that the latch member 22 is cross sectionally round in its centermost section and that its end sections are flattened so as to enable them to be positioned between the body members 14A and 14B.

By referring again to Figures 2 and 4 of the drawings it will be observed that the portion 15 of the cable 13, which is passed through the connecting member 14, is provided with a pair of U-shaped bolts 27 and registering clamping plates 28. Each of the U-shaped bolts extend through openings in each of the clamping plates 28 and are provided with nuts 29 so that the U-shaped bolts 27 comprise clamps positioned on the cable 13 near the end 15 thereof and near the connecting member 14. In operation these clamping members, formed of the U-shaped bolts and the clamping plates 28, are adjustable on the cable 13 and serve, in proper position with respect to the connecting member 14, to provide means for centering the opening 21 of the connecting member 14 with respect to the structural steel section 10. As best shown in Figure 4 of the drawings, the U-shaped bolts engage beneath the flange 11 of the I beam 10 thereby centering the sections of the cable 13 passing through the upper end of the connecting member 14 directly above the I beam 10.

It will be seen that the hoisting hitch shown and described herein makes possible the rapid positioning of the same on a section of structural steel to be lifted by simply removing the pin 26 and positioning the one portion of the cable 13 in the opening 21 of the connecting member 14. The latch member 22 is then moved into closed position with respect to the opening 21 so as to retain the cable 13 therein and the pin 26 is reinstalled. If uniform sizes of structural steel are being handled, single adjustment of the U-shaped clamping bolts 28 will automatically control the positioning of the cable 13 and the connecting member 14 with respect to the structural steel so as to center the same with respect to the free end 16 of the cable which is attached to the hook of the derrick or crane employed. When the structural steel shape is positioned and the lifting cable slacked off slightly, the pin 26 may be easily removed, the latch member 22 opened and the hoisting hitch withdrawn from about the structural steel member easily and quickly.

Having thus described my invention, what I claim is:

1. A hoisting hitch for structural steel members, comprising a section of endless cable and a connecting member, the said connecting member comprising a pair of body sections spaced with respect to one another by a spacing member and secured to one another therethrough, the said spacing member terminating short of the upper and lower ends of the said body members, a secondary spacing member positioned between the lowermost ends of the said body member and forming in conjunction with the body members and the spacing member a passageway through the said connecting member for the reception of the said flexible cable, registering openings formed in the said body members in their uppermost central portions and a latch member removably secured across the said uppermost openings and forming means for releasably securing sections of the said cable.

2. A hoisting hitch in accordance with claim 1 in which the passageway and the openings are positioned at right angles with respect to one another.

3. A hoisting hitch formed in accordance with claim 1 in which the uppermost portion of the secondary spacing member is rounded and the latch member is cross sectionally round throughout a majority of its area.

STEPHEN A. COONS.

REFERENCES CITED

The following references are of record in the file of this patent:

UNITED STATES PATENTS

| Number | Name | Date |
|---|---|---|
| 1,662,713 | Miller | Mar. 13, 1928 |
| 1,682,439 | Sullivan | Aug. 28, 1928 |
| 1,699,114 | Meagher | Jan. 15, 1929 |
| 1,864,974 | Buckley | June 28, 1932 |
| 2,080,148 | Naysmith | May 11, 1937 |
| 2,373,980 | Slavens | Apr. 17, 1945 |